Sept. 4, 1962           J. W. HENRY           3,052,744
GAS DISPLACEMENT ACTIVATOR FOR DEFERRED ACTION TYPE BATTERIES
Filed Oct. 7, 1949
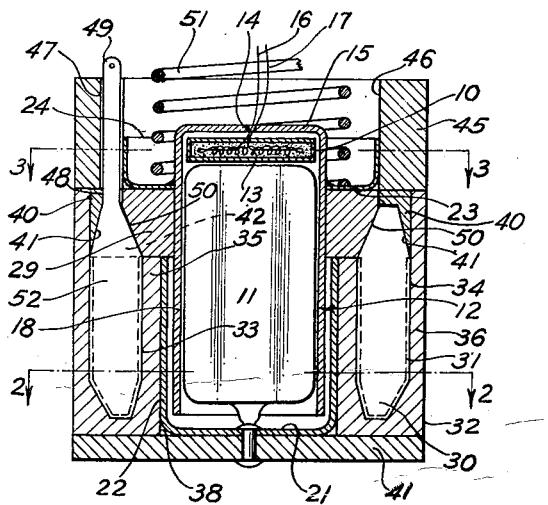
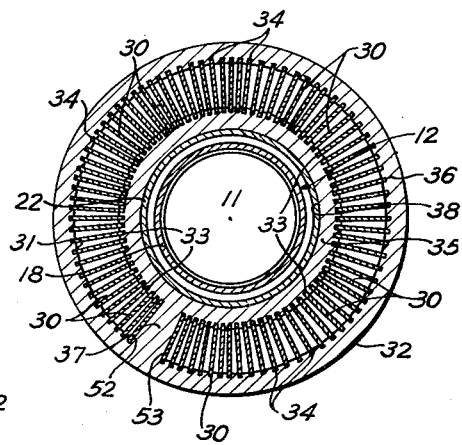
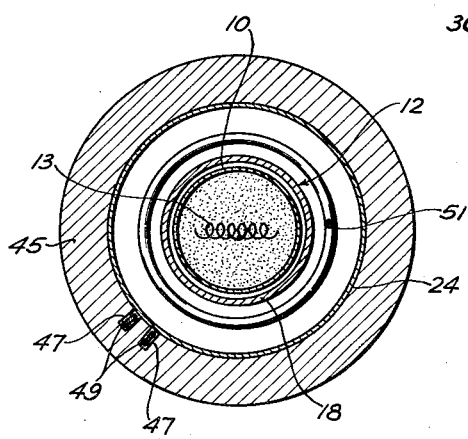
JAMES W. HENRY
INVENTOR
BY
ATTORNEYS United States Patent Office 3,052,744
Patented Sept. 4, 1962

3,052,744
GAS DISPLACEMENT ACTIVATOR FOR DE-
FERRED ACTION TYPE BATTERIES
James W. Henry, Kingsport, Tenn., assignor, by mesne
assignments, to the United States of America as represented by the Secretary of the Navy
Filed Oct. 7, 1949, Ser. No. 120,052
4 Claims. (Cl. 136—90)

This invention relates to small, high voltage batteries of the deferred action type, and in particular to improved means of transferring electrolyte from a sealed ampule to the plates of a deferred action type battery when it is desired to activate the cells of the battery.

In the type of deferred action batteries most extensively manufactured heretofore, thin horizontal annular and half-annulus plates were arranged in a ring-shaped stack with nonconducting annular separators between the plates. Kidney-shape apertures were provided in the separators, and rectangular filling notches were provided along the inner periphery of some of the annular and half-annulus plates. The bottom of a filling notch was at a greater radius from the axis of the stack than the inner edge of a kidney-shape aperture. The filling notches thus overlapped the apertures to form orifices for the radial flow of electrolyte into the volumes formed by the kidney-shape apertures between adjacent plates. Aligned small diameter leveling holes were provided in the plates to fill the cells established between those plates formed without filling notches and to allow the electrolyte to attain the same level in all the cells. The column of electrolyte in the aligned leveling holes caused "local short circuits" which resulted in wasteful and rapid solution of the electrode material and depletion of the electrolyte available to enter into electromchemical reaction and thus materially decreased the watt-second capacity of the cells.

An excessive noise voltage in the output of the batteries often caused premature detonation of the electric fuzes in which the batteries were used. The source of this excessive noise voltage has been associated with slow distribution of electrolyte to the cells through the aligned leveling holes.

It is an object of the invention to provide novel electrically initiated means of transferring electrolyte from a rupturable ampule to the cells of a deferred action type battery.

A further object is to provide improved means of filling the cells of a deferred action type battery with electrolyte which obviates the use of leveling holes in the battery plates.

Another object is to provide an improved deferred action type battery in which no intercommunication between cells is possible, thus eliminating "local short circuits" which wastefully depleted the electrolyte available to enter into electrochemical reaction in batteries heretofore manufactured.

A still further object of the invention is to provide a deferred action type battery which has a much greater watt-second capacity per unit plate area than deferred action type batteries heretofore constructed.

It is also an object of the invention to provide means of transferring electrolyte from a rupturable ampule to the cells of a deferred action type battery in a minimum of time. Noise voltage in the battery output due to slow distribution of electrolyte to the cells will thus be minimized.

Briefly this may be accomplished by arranging a plurality of spaced battery plates within a housing of insulating material, assembling an electrically detonated explosive squib and a rupturable ampule containing electrolyte within a normally closed container which is adapted to seal the housing when in its closed position, spring urging the container closed, and electrically detonating the squib at a predetermined interval after the projectile is fired whereby the expanding gases from burning powder will shatter the ampule, force open the container, and cause the electrolyte to flow into the housing between battery plates, and when pressure subsides the container will be urged closed by spring action to reseal the housing to prevent leakage of electrolyte between the cells.

Other objects and advantages of the invention will be apparent from the following description taken in connection with the accompanying drawings which form a part hereof.

In the drawings:
FIG. 1 is a vertical sectional view through a deferred action type of battery embodying the invention;
FIG. 2 is a horizontal section on line 2—2 of FIG. 1; and
FIG. 3 is a horizontal section on line 3—3 of FIG. 1.

In a preferred embodiment of the invention shown in the drawings a plastic explosive squib 10 and a rupturable ampule 11 are assembled within a cylindrical inner cup 12 that is open on one end. The plastic squib 10 is filled with a deflagrating explosive and contains an igniting wire filament 13 which can be heated by the passage of electrical current to detonate the explosive charge. Projecting upwardly from the squib 10 through an aperture 14 in the closed end 15 of the inner cup 12 are electrical conductors 16 and 17 attached to the wire filament 13 and adapted to be connected to a suitable source of power for detonating the squib 10. The sealed glass ampule 11 containing electrolyte is positioned below the squib 10 with a portion thereof extending through the open end and below the side walls 18 of the inner cup 12 and resting against the bottom wall 21 of the hollowed cylindrical outer cup 22. The open end of the inner cup 12 extends into the open end of the outer cup 22 to telescope the inner cup 12 within the larger diameter outer cup 22.

The closed end 15 of the inner cup 12 extends through a circular aperture formed in the bottom wall 23 of a cup-shape inner guide ring 24 which is constructed preferably of deep drawing steel and secured to the outer periphery of the inner cup 12 by welding or soldering. An annular sealing gasket 29 having a smaller inner diameter than the outer cup 22 is affixed by adhesion to the outer periphery of the inner cup 12 beneath the bottom wall 23 of the inner guide ring 24. When the inner cup 12 and the outer cup 22 are telescoped together with the closed ends thereof spaced apart, the sealing gasket 29 is clamped between the bottom wall 23 and the open end of the outer cup 22.

In a preferred embodiment of the invention flat vertical battery plates 30 are positioned radially within an annular groove 31 provided in a ring-shaped housing 32 which is molded preferably of a suitable elastomeric thermoplastic such as a copolymer of vinyl chloride and vinyl acetate. The battery plates 30 are approximately trapezoidal in shape with a coating of electronegative metal on one flat surface thereof and a coating of electropositive material on the opposite side. The coatings are applied either by electrodeposition or by rolling thin layers of material on the base plate, or a single electrode material coating is applied to a base plate of the opposite electrode material, e.g., a coating of carbon on a base plate of zinc. The housing 32 is molded with a plurality of vertical indentations 33 and 34 spaced at equal angular displacements around the outer circumference of the inner wall 35 and the inner periphery of the outer wall 36 which form the annular groove 31. The thin battery plates 30 are assembled in the annular groove 31 of the ring-shaped housing 32 with the parallel longitudinal edges thereof fitting snugly in the vertical indentations 33 and 34 to form a ring of radial battery plates. The housing 32 is molded with a single vertical barrier 37 across the width of the annular groove 31 to insulate between the low and the high potential ends of the battery. The outer cup 22 fits snugly within a central cylindrical aperture 38 molded axially in the housing 32.

After the vertical battery plates 30 are assembled radially in the groove 31, an annular cap 40, also preferably molded of an elastomeric thermoplastic, is disposed above the battery plates 30 with a downwardly extending edge 41 thereof abutting against the inner periphery of the outer wall 36. The cap 40 is fused to the outer wall 36 by dielectric heating or other well known methods of fusing plastic materials to form a jacket of plastic completely encompassing the ring of radial battery plates 30 except for an annular aperture 50 between the cap 40 and the upper edge of the inner wall 35. The annular cap 40 has a single downwardly extending rib 42 which forms a continuation of the vertical barrier 37 molded within the groove 31 to insulate the low from the high potential end of the battery.

A base is conveniently assembled to the battery by riveting a disk 41 of suitable insulating material to the bottom wall 21 of the outer cup 22. In an assembled fuze a cylindrical connector block 45 of suitable insulating material is disposed coaxially above the annular housing 32. A cylindrical aperture 46, of slightly larger diameter than the inner guide ring 24, is provided in the connector block 45 to direct the upward motion of the inner cup 12 under the pressure of expanding gases from the detonation of the squib 10. Radial grooves 47 and 48 are provided in the connector block 45 and in the cap 40 respectively to receive upwardly extending connection lugs 49 formed on the battery plates 52 and 53 which are disposed on opposite sides of the vertical barrier 37. The plates 30 are in potential series with the plates 52 and 53 at the low and high potential ends of the battery.

In the process of assembling the battery into an electric fuze, a helical spring 51 is depressed against the bottom wall 23 of the inner guide ring 24 with the closed end of the inner cup 12 extending into the helical spring 51. The compressive stresses in the helical spring 51 clamp the annular gasket 29 against both the open end of the outer cup 22 and the upper edge of the inner wall 35 to form a leakproof seal between the telescoping inner cup 12 and outer cup 22 and to close the circular aperture 50 formed between the annular cap 40 and the upper edge of the inner wall 35. The gasket 29 is compressed against the inner edges of the battery plates 30 to seal the housing of insulation enveloping the plates and thus confine electrolyte to the volumes between adjacent plates 30 in an activated battery.

When it is desired to activate the cells of the battery, the circuit between the electrical conductors 16 and 17 and a suitable power supply (not shown) is closed, thus causing detonation of the squib 10. It is possible to activate the cells by the detonation of the squib 10 before or after or simultaneously with the firing of a projectile. The interval after the firing of a projectile at which the cells will be established can be predetermined by utilizing any of the usual airvane, gear reduction, or other time delay fuze switches to complete the electrical circuit to the igniting filament 13. The expanding gases from the burning explosive force open the plastic squib 10, thus pressing the bottom of the plastic case against the top of the glass ampule 16. When sufficient pressure has been built up the glass ampule 11 ruptures, releasing the electrolyte to flow into the volume between the inner cup 12 and the outer cup 22 until the electrolyte is stopped by the sealing gasket 29. The full pressure of the expanding gases is exerted against the closed end 15 of the inner cup 12. When sufficient pressure has been built up to overcome the compressive stresses in the helical spring 51, the inner cup 12 rises. The annular gasket 29 rises vertically with the inner cup 12 to break the seal between the outer cup 22 and the inner cup 12 and to open the circular aperture 50. The pressure exerted by the expanding gases forces the electrolyte to flow radially through the circular aperture 50 into the annular groove 31 and between the plates 30 to fill the cells of the battery.

After the cells are filled with electrolyte, cooling and partial escape of the gases eventually removes the pressure from against the closed end 15 of the inner cup 12. The compression spring 51 is then free to return the inner cup 12 and the sealing gasket 29 to the sealing position. The stresses in the helical spring 51 again compress the annular gasket 29 against the inner edges of the battery plates 30 to close the circular aperture 50 and seal the housing of insulating material enveloping the plates 30. Closing of the circular aperture 50 confines the electrolyte in each cell to the volume between adjacent battery plates 30 and prevents "local short circuiting" of the individual cells. Due to slight gaseous leakage around the sealing gasket 29 there is an equalization of pressure which allows the cells to function unaffected by pressure differential.

From the foregoing description it will be observed that there is provided a simple and substantially instantaneous means of transferring the electrolyte to the cells at the time of, or at any desired interval after, the firing of a projectile. It will also be apparent that the plates are formed without leveling holes and that no intercommunication between cells is possible. "Local short circuits" have thus been entirely eliminated, and the entire inherent chemical energy of the cells is transformed into electrical energy. The pressure of the expanding gases from the detonation of the squib builds up practically instantaneously, and the transfer of electrolyte to the cells is accomplished in a fraction of a second. Thus, noise voltage in the battery output due to slow distribution of the electrolyte to the cells has been eliminated.

While the embodiment of the present invention as herein disclosed constitutes a preferred form, it is to be understood that other forms might be adopted, all within the scope of the claims which follow.

Having thus described my invention, what I claim is new and desire to secure by Letters Patent of the United States is:

1. In a deferred action type of battery, a housing of insulating material, a plurality of battery plates arranged in spaced relation within said housing, a normally closed container having a supply of electrolyte positioned therein and adapted to seal off said housing when in its closed position, spring means urging said container closed, and temporary pressure means for opening said container and forcing electrolyte into said housing, whereby said spring means again closes said container to reseal said housing when pressure subsides.

2. In a deferred action type of battery, a plurality of battery plates, a housing of insulating material in which the plates are arranged in spaced relation, a separable member adapted to close said housing, spring means urging said separable member closed, a rupturable ampule filled with electrolyte, temporary pressure means for rupturing said ampule, a two member means containing said ampule and responsive to said pressure means for opening said separable member against the force of said spring means, one of said members carrying said separable member, whereby said pressure means forces electrolyte from the ruptured ampule into said housing and when pressure subsides said spring means again closes said housing.

3. In a deferred action type of battery, a plurality of spaced battery plates, a jacket of insulation closely enveloping the spaced plates, a normally closed container adjacent to the plates, a rupturable ampulse filled with electrolyte assembled within said container, a closure member affixed to said container and adapted to seal said jacket when closed, spring means urging said container closed, and temporary pressure means for rupturing said ampule and forcing open said closure member and container whereby upon operation of said pressure means said jacket is unsealed and electrolyte from the ruptured ampule is forced to flow into said jacket and between said plates and when pressure subsides said spring means again closes said container to reseal said jacket.

4. In a deferred action type of battery, a plurality of battery plates, an annular housing of insulating material in which the spaced plates are radially arranged, a pair of telescoping cylindrical containers having the opposite ends thereof closed extending through the aperture in said annular housing, an electrically operated detonator assembled within said containers, an ampule rupturable by said detonator and filled with electrolyte also assembled within said containers, spring means urging said containers together, an annular gasket affixed to the smaller of said telescoping containers and abutting against the open end of the larger container to form a leakproof seal between said containers, said annular gasket being adapted to seal said housing when the containers are together, whereby expanding gases from the firing of said detonator will force said telescoping containers apart to unseal said housing and to force electrolyte from the ruptured ampule into said housing and when pressure subsides said spring means again forces said containers together to reseal said housing.

References Cited in the file of this patent
UNITED STATES PATENTS

| | | |
|---|---|---|
| 2,403,567 | Wales | July 9, 1946 |
| 2,404,144 | Riggs et al. | July 16, 1946 |
| 2,433,024 | Burgess | Dec. 23, 1947 |
| 2,502,723 | Harriss | Apr. 4, 1950 |